Figure 1:
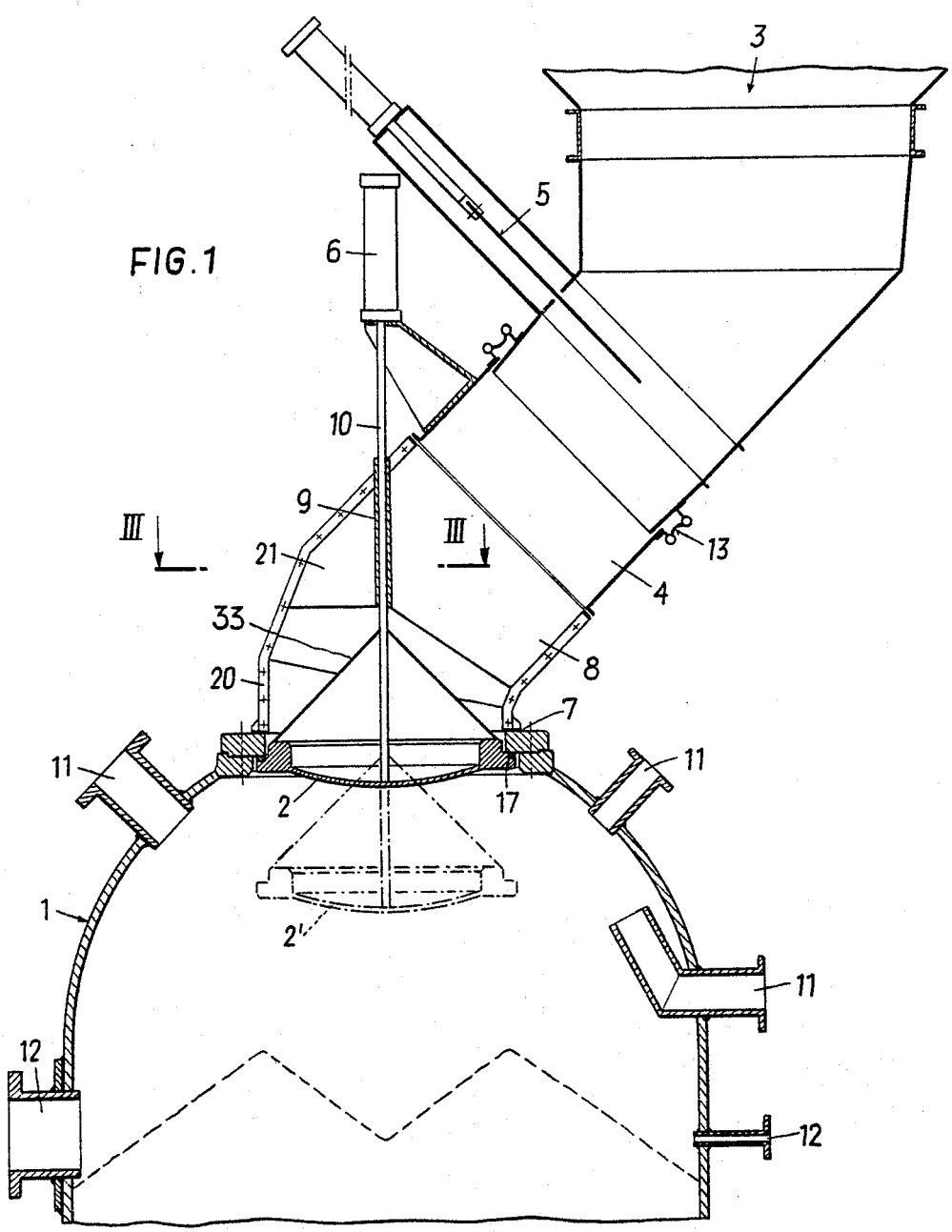

United States Patent [19]

Stadler

[11] Patent Number: 4,747,741
[45] Date of Patent: May 31, 1988

[54] DEVICE FOR CLOSING THE CHARGING OPENING FOR PRESSURE RESISTANT CONTAINERS

[75] Inventor: Johann Stadler, Hellmonsödt, Austria

[73] Assignee: Voest-Alpine Aktiengesellschaft, Vienna, Austria

[21] Appl. No.: 451,051

[22] Filed: Dec. 20, 1982

[51] Int. Cl.$^4$ ............................................. C10B 31/04
[52] U.S. Cl. .................... 414/202; 414/201; 48/86 R; 202/262; 266/184
[58] Field of Search ............................. 414/199–206; 48/86 R; 202/262; 266/184

[56] References Cited

U.S. PATENT DOCUMENTS

| | | | |
|---|---|---|---|
| 2,765,935 | 10/1956 | Schuman | 414/202 |
| 3,182,983 | 5/1965 | Tsujihata et al. | 414/202 |
| 4,412,770 | 11/1983 | Galow et al. | 414/201 X |

Primary Examiner—Frank E. Werner
Attorney, Agent, or Firm—Cushman, Darby & Cushman

[57] ABSTRACT

The device for closing the charging opening of an autoclave (1) has a cover (2) which can be lowered into the interior of the autoclave by means of a drive means supported at the outer side of the autoclave (1). The charging opening overlaps with its annular rim (7) the sealing surface (17) of the cover (2).

10 Claims, 2 Drawing Sheets

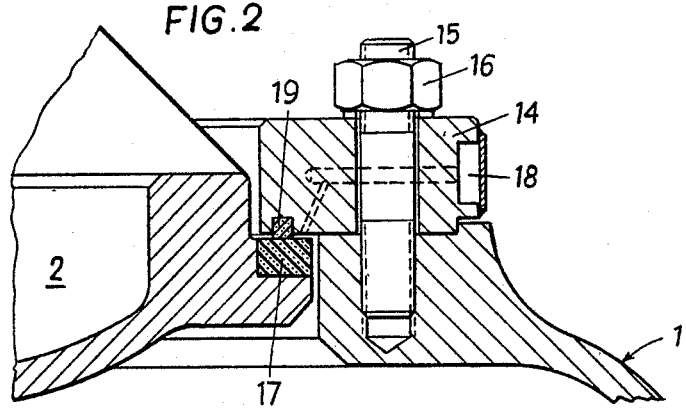
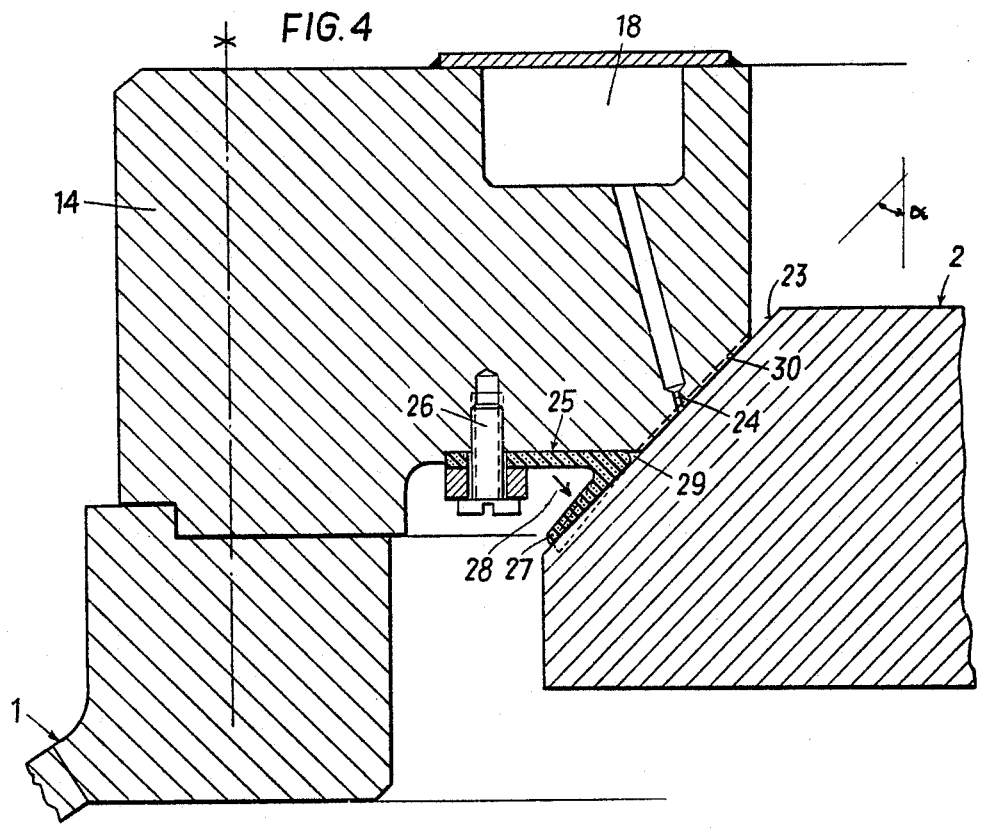
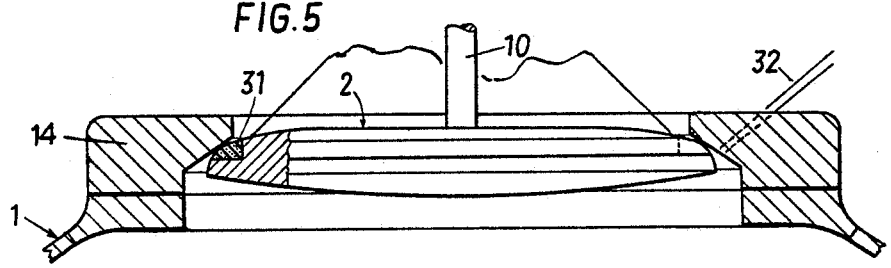

DEVICE FOR CLOSING THE CHARGING OPENING FOR PRESSURE RESISTANT CONTAINERS

The invention refers to a device for closing the charging opening for pressure-resistant containers, in particular autoclaves, comprising a cover having a diameter exceeding the diameter of the opening and comprising a drive means for opening and closing the cover. Particularly when drying coal according to the Fleissner-process it is necessary to introduce granular or, respectively, lumpy material into an autoclave which is subsequently subjected to the action of hot steam or, respectively, saturated steam under pressure. A relatively great charging opening is this required for introducing the coal to be dried and such charging openings were up till now closed by a lid or cover hingedly connected to the autoclave at its outer side. For reliably closing the lid or cover, a number of constructions have become known with which in particular a more or less complicated bayonet catch was provided for locking the lid or cover by rotating same. In view of the lid or cover having been designed for being swivelled in outward direction, separate drives had to be provided for effecting both the swivelling movement of the lid or cover as well as for locking the lid or cover by rotating same and a corresponding control for the swivelling drive of the lid or cover and for the rotating drive for locking the bayonet catch had also to be provided. In view of the lid or cover having been designed for being swivelled in outward direction, also a rotatable chute had to be provided for introducing into the autoclave the coal to be dried. This rotatable chute required, in addition to a separate drive means and a corresponding control therefor, a dust exhauster.

It is an object of the invention to provide a device of the initially mentioned type which can permanently be maintained in a dust-tight connection with a charging bunker and which allows the autoclave to be opened and closed in a simple manner without the risk of maloperation. For achieving this object, the invention is essentially characterized in that the cover is guided for being lowered into the interior of the container and in that the drive means for opening or closing the cover is supported against the outer side of the container. In view of the autoclave never being filled with lumpy material up to its upper edge, there is always sufficient free space for lowering the cover without the necessity to increase the actual volume of the autoclave for a given useful volume. In view of the cover being closed by lifting same, the pressure generated within the autoclave during steaming is acting in closing direction of the cover so that the cover is reliably brought into sealing engagement. The tightening force exerted by such a cover has, for a cover of a diameter of approximately 1 m and for an acting pressure of approximately 40 bar, a value of more than 300 t, and in this manner it is made sure that the autoclave can not unintenionally be opened as long as the autoclave is subjected to pressure. The weight of the cover is, for the mentioned diameter of approximately 1 m, approximately 500 kg and a cover of such a weight can be lowered and lifted by a simple hydraulic cylinder-piston-aggregate. Thus, a comparatively simple drive means for opening or closing the cover becomes possible, the closing pressure being provided by the pressure generated within the autoclave.

According to the invention, the arrangement can in a simple manner be such that in operation a connection sleeve is connected with the opening and carries a guide means for a rod carrying the cover and being arranged for being lifted and lowered. Thus, a sealing connection to the charging bunker is made possible and one can do without a separate exhauster for removing the dust formed when introducing lumpy or granular material. For this purpose, a charging bunker comprising a closable discharge opening and being stationary relative to the pressure-resistent container can be connected to the connecting sleeve via a stationary and tightly connected conduit.

The charging opening of the container has preferably a rim overlapping the cover or, respectively, its sealing surface and carries preferably an annular sealing element. In this manner, the rim of the container can be correspondingly worked and annular insert members can be provided which have the required strength properties for supporting the cover. In a simple manner, the cover can have a conical edge cooperating with the annular rim of the container and the annular rim of the container may carry an annular lip seal. Such a lip seal is capable of compensating any working inaccuracy of the conical edge or the cover and has in particular the advantage that the sealing lip is pressed against the conical edge of the cover by the pressure prevailing within the autoclave, whereby the sealing effect is improved. The arrangement can, however, also be such that the edge of the cover and/or the annular rim of the container has a crowned seat surface and/or sealing surface. In this case, one can do without a separate sealing because a line contact resulting in a complete seal can be obtained between the crowned surface of the cover or of the annular rim of the container and the opposite surface of the respective other part. In this case, insert members of various material such a bronce or white metal can be used for achieving an exact seal.

For preventing granular or, respectively, lumpy material from remaining between the sealing surfaces or, respectively, the seat surfaces of the cover cooperating with the annular rim of the container, the annular rim of the container comprises, according to the invention, nozzles for blowing pressurized air or steam onto the seat surfaces and/or sealing surfaces of the cover.

If a separate seal is provided adjacent the seat surface of the cover, i.e. at the rim, a cushion of pressurized air or steam could be enclosed between the sealing element and the seat surface of the cover at the rim of the opening when applying pressurized air or steam onto this seat surface and this air or steam cushion might affect the exact seal of the sealing element, in particular the lip seal. With such a construction, the annular rim of the container has therefore preferably substantially radially extending grooves at its surface area cooperating with the edge of the cover, so that the sealing lip and, respectively, the sealing element is reliably pressed against the circumference of the cover. With this arrangement, there must, of course, be provided a separate sealing element at any rate.

In a simple manner, the connecting sleeve is designed for being separable in an axial plane so that the guide means for the drive means of the cover can exactly be adjusted and fixed in position. In this case, the drive means for opening and, respectively, closing the cover can be formed by a hydraulic cylinder-piston-aggregate supported on the connecting sleeve or on the connecting conduit leading to the charging bunker, the guide means for the rod carrying the cover and being arranged for being lifted and lowered preferably being formed of a tube fixed relative to the connecting sleeve. In view of the connecting sleeve being formed of separable components, the tube for guiding the rod can be fixed in position in a particularly simple manner.

Preferably, the cover carries a conical baffle plate at its side facing the connecting sleeve so that the side facing the connecting sleeve can be kept free of lumpy or granular material already after having finished the charging operation and already prior to closing the cover.

Figure 3:
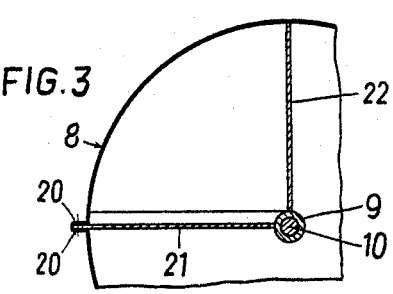

In the following the invention is further illustrated with reference to embodiments shown in the drawing. In the drawing, FIG. 1 schematically shows in an axial section the upper portion of an autoclave as well as the connection to a charging bunker, FIG. 2 shows in an enlarged scale and along the same section as FIG. 1 the contacting surface between the cover and the rim of the autoclave, FIG. 3 shows a section along line III—III of FIG. 1, FIG. 4 shows an other constructon of the contacting surface between the cover and the rim of the autoclave in a section similar to that of FIG. 2 and FIG. 5 in an analogous representation as FIG. 4 shows an other construction of the contacting surface of the cover contacting the rim of the container.

In FIG. 1 there is shown the upper portion of an autoclave 1 which is closed by a cover 2. The charging bunker is designated 3 and is in connection with the autoclave 1 via a tightly closed charging conduit or chute 4. The charging bunker 3 can be closed by means of a hydraulically operated slide valve 5 not shown in detail.

Opening and, respectively, closing of the cover is effected by means of hydraulic cylinder-piston-aggregate 6 which is supported on the charging conduit 4. Immediately adjacent the rim 7 of the opening of the autoclave 1 there is supported a connecting sleeve 8 carrying a guide tube 9 for the actuating rod 10 of the cover 2. By lowering and rod 10, the cover can be brought into the lowered position 2', shown in dashed lines, whereby, with the slide valve 5 opened, the lumpy material, for example wet coal, is transferred from the charging bunker 3 into the autoclave 1. After having closed the slide valve 5 the cover 2 is also closed by lifting the rod 10 and the material to be dried can be preheated by spraying thereon hot water via one of the connection sockets 11 prior to introducing hot steam or saturated steam, respectively, into the autoclave for effecting drying of the coal according to the known operating cycle of the Fleibner-process. The elements of a level meter for measuring the height of the material within the autoclave are designated 12 and used for controlling the slide valve 5 as well as the hydraulic cylinder-piston-aggregate 6 for the cover.

The connecting sleeve 8 is tightly connected with the lower rim of the charging bunker 3 and a compensating element 13 for compensating temperature changes is provided, thereby maintaining a tight connection.

The edge of the cover 2 is shown in FIG. 2 in an enlarged scale. An annular member forming the rim of the autoclave is fixed by means of threaded bolts 15 and nuts 16 and overlaps the sealing surfaces 17 of the edge of the cover 2. Passages 18 are provided within this annular member forming the rim of the opening of the autoclave for supplying thereto pressurized air or steam which is applied onto the sealing surfaces of the cover. The annular rim 14 carries additionally a sealing element 19 which can be pressed against the sealing surface 17 of the cover 2 by means of steam. Such sealing elements can be formed of graphite cords, asbestos cords, hollow asbestos rings or carbon fibres coated with synthetic plastics material.

The mounting of the guide tube 9 for the rod 10 on the connecting sleeve 8 is shown in FIG. 3. The connecting sleeve 8 is separable into two parts along the plane of the drawing of FIG. 1 and has flanges 20 located in an axial plane and supporting plates 21 for the guide tube 9 can be fixed to said flanges. A further supporting plate 22 is provided in a plane substantially normally extending relative to the supporting plate 21 for exactly adjusting the guide tube 9 which is connected to one half of the connecting sleeve 8 at its inner circumference.

FIG. 4 shows a modified embodiment of the cover 2. This cover 2 has a conical sealing surface 23 which is inclined relative to the axis of the cover and, respectively, relative to the actuating rod 10 for an angle of approximately 45°. The annular rim 14 of the autoclave 1 again has passages 18 for supplying pressurized air or steam and these passages open via nozzles 24 at the seat surfaces of the cover. A sealing element 25 is fixed to the bottom side of the annular rim 14 of the autoclave 1 by means of screws 26, said sealing element substantially having the shape of a ring surrounding the cover 2 and comprising a sealing lip 27 being inclined, in a relaxed condition, relative to the axis of the cover for an angle which is slightly smaller than is the angle $\alpha$ included between the conical surface 23 and the axis of the cover. The sealing lip can, in a simple manner, consist of PTFE and particularly can be formed of carbon fibres coated with PTFE. The pressure generated within the autoclave after having closed the cover is, with this embodiment, acting in direction of arrow 28 and is thus improving the sealing effect.

When applying to the seat surfaces pressurized air or steam via the nozzles 24, a pressure possibly obstructing the sealing lip 27 from becoming pressed under pressure against the sealing surface could be generated within the space 29 between the sealing, the cover and the annular rim 14 of the autoclave, and for this reason substantially radially extending grooves 30 are provided in the seat surface of the annular rim 14 having the shape of a hollow cone for reliably allowing the pressurized air to escape from the space 29.

In the embodiment according to FIG. 5, the annular rim 14 of the autoclave 1 again has a seat surface having the shape of a hollow cone. The edge of the cover is crowned and has an insert member 31. By suitably selecting the materials of the annular rim 14 of the autoclave 1 and of the insert member 31 provided on the cover, a reliable line contact is obtained over the whole circumference of the cover 2, so that one can do without a separate sealing element. Also in this case it is particularly advantages to rinse the seat surfaces and, respectively, the sealing surfaces with pressurized air or steam supplied via passages 32.

As can particularly be derived from FIG. 1, the cover 2 may carry a conical baffle plate 33 via which the material to be charged is distributed within the autoclave.

What is claimed is:

1. A closure device for the charging opening of a pressure resistant autoclave, the charging opening having an inwardly extending annular rim forming a sealing surface with a closure member, an annular sealing element situated on the annular rim, the annular rim further provided with at least one outlet for blowing pressurized air onto the sealing surface of the annular rim and a sealing surface of the closure member thereby removing adhering debris, the closure device further provided with a drive means supported outside of the autoclave for opening and closing the closure member, the closure being lowered into the interior of the autoclave during the opening stage.

2. Device according to claim 1, characterized in that in operation a connection sleeve is connected with the opening and carries a guide means for a rod carrying the closure and being arranged for being lifted and lowered.

3. Device according to claim 2, characterized in that the guide means for the liftable and lowerable rod connected with the closure is formed of a tube being fixed to the connecting sleeve.

4. Device according to claim 1, characterized in that a charging bunker comprising a closable discharge opening and being stationary relative to the pressure-resistant autoclave and connected to the connecting sleeve via a stationary and tightly connected conduit.

5. Device according to claim 4, characterized in that the connecting sleeve is designed for being separable along an axial plane.

6. Device according to claim 1, characterized in that the closure has a conical edge cooperating with the annular rim of the charging opening and in that the annular rim carries an annular lip seal.

7. Device according to claim 1, characterized in that the edges of the closure and the annular rim have cooperating crowned seat surfaces.

8. Device according to claim 1, characterized in that the annular rim has at its surface cooperating with the edge of the closure substantially radially extending grooves.

9. Device according to claim 1, characterized in that the drive means for opening and closing the closure is formed of a hydraulic cylinder-piston-aggregate supported on the connecting sleeve.

10. Device according to claim 1, characterized in that the closure has a conical baffle plate on its outer facing.

* * * * *